Feb. 7, 1967    P. A. MARFONE ETAL    3,302,463
SPACE ENVIRONMENT SIMULATOR
Filed June 26, 1961    4 Sheets-Sheet 2
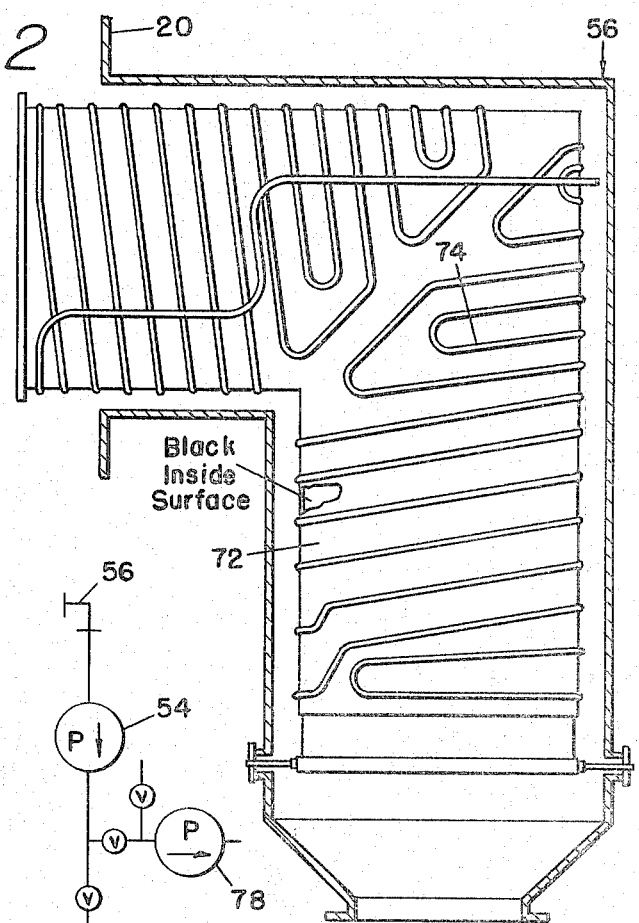
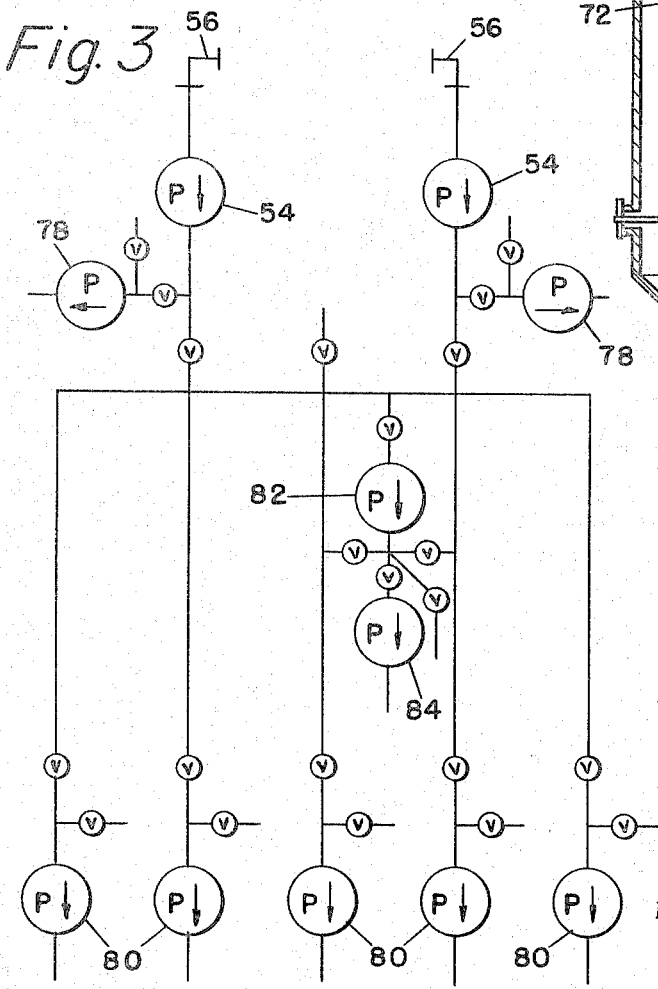
INVENTORS
ALEXANDER LENGYEL
PATRICK A. MARFONE
BY
Henry W. Kaufmann
AGENT

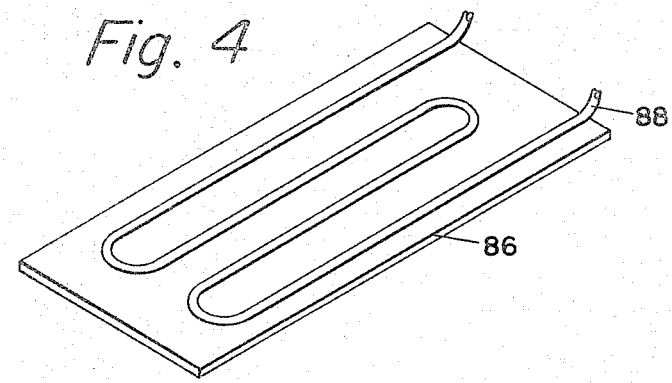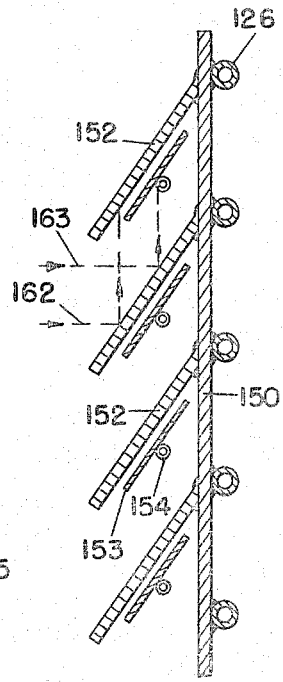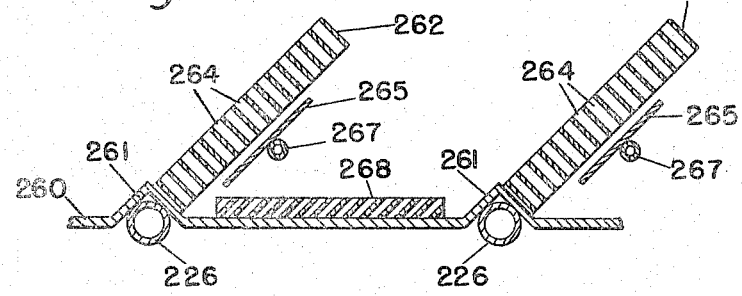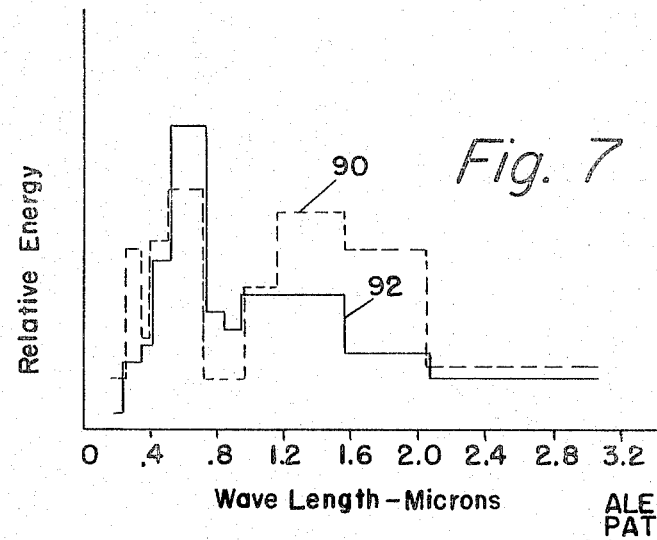

Feb. 7, 1967  P. A. MARFONE ET AL  3,302,463
SPACE ENVIRONMENT SIMULATOR

Filed June 26, 1961  4 Sheets-Sheet 4

INVENTORS
ALEXANDER LENGYEL
PATRICK A. MARFONE
BY
Henry W. Kaufmann
AGENT

United States Patent Office 3,302,463
Patented Feb. 7, 1967

3,302,463
SPACE ENVIRONMENT SIMULATOR
Patrick Anthony Marfone, King of Prussia, and Alexander Lengyel, Paoli, Pa., assignors to General Electric Company, a corporation of New York
Filed June 26, 1961, Ser. No. 119,387
7 Claims. (Cl. 73—432)

This invention pertains to means and methods for simulating terrestrially the technically important conditions existing in space, both for testing and for experimental and technical purposes.

Testing of mechanical devices under simulated conditions of use is old. Heretofore, the conditions to be simulated have been terrestrial and, while they may have involved the simulation of submarine or subterranean environments, they have not generally included phenomena not known by terrestrial experience. Imagination has provided much fanciful literature dealing with space travel, going back to Icarus and Pegasus in ancient mythology, and including in fairly modern history the extremely plausible writings of Jules Verne, whose "From the Earth to the Moon" deals in some detail with problems of life support, reentry, and missile recovery. Satellite operations have made common the knowledge that many phenomena whose effects could only be guessed a priori are of controlling importance in space.

For exact duplication of all the phenomena existing in a space environment, it is necessary to move into space; but this implies the expenditure of an untested vehicle in a flight to determine whether it is viable under the conditions proposed for it. This is extremely expensive and, under existing conditions, time-consuming. A need exists for a test environment which can be relied upon to provide, cheaply and accessibly, adequate approximations to environmental conditions known to exist in space and known or suspected to be important to the functioning of space equipment. Means to provide this have been frequently imagined, and described in terms functional at the exact point of novelty. The present invention does not profess to compete in perfection with the products of fiction; it has, however, the peculiar virtue of being operative in practice.

As is obvious from the foregoing, this disclosure will, for completeness, include a variety of discussion of which some parts will be of secondary interest to those extremely familiar with the existing art and knowledge. Therefore topical headings have been employed as follows:

I. General Discussion of Simulation Requirements
II. General Discussion of Simulation Techniques
III. Specification Synopsis
IV. Mechanical Structure
V. Temperature and Pressure Control Means
VI. Solar Radiation Simulator
VII. Earth Albedo and Radiation Simulation
VIII. Summary

*I. General discussion of simulation requirements*

Two parameters obviously important in a space environment simulator are internal pressure and temperature. Another which would be desirable to simulate, but which presently known technology does not permit, is prolonged absence of the acceleration of gravity as observed from the test or experimental vehicle or apparatus. This characteristic, despite its great appeal to the imagination, is of little importance in many tests.

A peculiarity of free extraterrestrial space (sometimes denoted as "black" space) is its non-reflective character, both with respect to radiation and to emitted particles. Thus, while an object which bears on its surface rather typically terrestrial molecules such as oil films will emit these by evaporation, in space such particles will pass out without appreciable return; and the molecules which bombard the surface in return will be the inorganic gases of space. Thus it does not suffice for simulation of space to reduce the ambient pressure to the proper magnitude; it is also important to insure that the kind of bombarding molecules which produce the residual pressure is correct as a simulation.

The restrictions upon the nature of the residual gas, which have just been mentioned, arise essentially from the fact that, while temperatures, pressures, and radiant energy density and spectral distribution may be substantially duplicated, the vast dimensions of our solar system are only simulated.

Other characteristics of a space environment, particularly in proximity to the earth, are radiation from the sun, covering an extremely wide spectrum, and the albedo and radiation of the earth. For testing power generation by absorption of radiant energy, for determining the heat balance of devices operating in space, and for predicting the mechanical life of various materials under low temperature and low pressure and extra-atmospheric radiation, a sufficient approximation to such radiation is of very great importance. Ideally, the radiation from the sun may be duplicated by providing a body at the temperature of the sun. To provide such a source for hours at a time is beyond the economic scope of present technology. One of the features of the device disclosed here is the provision of a synthetic equivalent to solar radiation, not by the wasteful process of providing radiation whose distribution over its entire spectrum is identical with that of solar radiation, but by dividing the solar spectrum into bands so chosen that the total energy within a given band is a sufficient measure of the effects of radiation within that band, and providing in each such band a density of energy which bears to the total energy in all bands the same relation which the energy density of solar radiation in that band bears to the total energy density of solar radiation. This is less than ideal; but it possesses the peculiar advantage of being economically feasible; and sufficient information is available concerning the effects of energy within these bands to render tests made with such synthesized radiation useful in predicting the effects of solar radiation.

The dimensional differences between the solar system and a terrestrial simulator of the system impose an unusual requirement on the source of simulated solar radiation. Viewed from the vicinity of the earth, the sun usbtends roughly 0.01 radian, so that it is a fair approximation to a point source of radiation, and rays from it will be nearly parallel. On the other hand, since it subtends only a very small solid angle, scattered radiation from the vicinity of the earth will be reflected by the sun back to the earth only to a negligible extent. A conventional approach to the problem of providing a simulated solar source has been the use of a large searchlight with a reflector to collimate the radiation. To provide substantially parallel rays from such a searchlight, the reflector must extend opposite practically the entire surface to be illuminated. This is a rather considerable solid angle, and, while the reflectivity of any material chosen for a reflector will obviously be high, with correspondingly low emissivity, the extremely low permissible stray or random radiation density which may fall upon the test piece renders it necessary for accurate simulation that the temperature of any reflecting surface employed in the chamber as part of the solar source be controlled below a maximum which will be determined by the emissivity of the surface. The conventional practice to date has omitted this precaution. Another peculiar requirement for adequate simulation of space is that radiation which is emitted from the test object at an angle with the incident solar simulation must not be reflected back to the test object even if it should fall upon the reflector surface; any rays which do not simply retrace the path of incident radiation back to the source must fall upon "black-cold" surfaces. A simulated solar source having the characteristics described is called, for convenient distinction, a "black" or "cold" solar source (or, even, "sun," by way of metaphor).

The typical earth-bound individual subtends to his horizons so small a portion of the earth's surface that he is ordinarily quite unconscious of the earth's reflection of the radiation it receives from space and, even if snow makes him conscious of visible glare, his low sensitivity to thermal radiation leaves him unaware of the heat that is being radiated. A satellite circling the earth will subtend a much larger portion of the earth's surface, and may receive very large radiation density from it; this density will undergo variation with changes in the relative positions of the sun, the earth and the satellite, and with changes in the earth's cloud coverage. It has been estimated that variations in cloud coverage and in the nature of the earth surface may cause the earth's albedo to vary from 3 to 86 percent of the incident solar radiation. The earth appears to be a Lambert reflector, following the cosine law; but its radiation to a satellite relatively close to it will be a somewhat more complicated function than the radiation from a perfectly diffusing irradiated sphere to a point which is at a distance large compared with the diameter of the sphere. Therefore it may be necessary, in providing for adequate simulation of a space environment, to simulate the radiation from the earth by a source not only of adequate spectral match and of sufficient maximum energy density, but one whose orientation with respect to the test object and to the simulated solar radiation may be adjusted at will, and whose intensity may be adjusted over a wide range.

The vast majority of space devices employ apparatus which produces or receives radiation in the radio-frequency spectrum. However, the sensitivity of radio receivers is such that the intensity of radiation they require for operation is not great enough, generally, to produce significant effects in other parts of the spectrum, such as the infrared. Even space-borne transmitters tend to operate at relatively low power levels. Therefore it is not essential at this time to furnish the simulator with interior parts which are non-reflecting to radio waves. If this should ever be found necessary, so-called "radar camouflage" materials are known which can, without impairment of their own properties, be coated with optically and thermally non-reflecting materials, to produce an environment which is substantially non-reflecting throughout a wavelength range extending from the Schumann region to centimeters or beyond. It should be observed that the heat dissipated by radio equipment from the operating power supplied to it may be appreciable; but this dissipation can usually be adequately simulated without the necessity of actual receipt or radiation of radio-frequency energy.

In summary, then, what is required for useful simulation of conditions in space is that the test object be maintained at a sufficiently low pressure of gas of satisfactory kind, different from some of the molecules which may evaporate from its surface; that the test object be shielded from radiation over a frequency range extending from the ultraviolet into the far infrared; and that any emissions from it in the same spectral region be absorbed with only negligible reflections back to the object. In addition, the radiation from the sun and possibly from the earth incident upon the test object must be adequately simulated. The present technical impossibility of eliminating the gravitational field renders it not feasible to do so, but this is of no importance for many investigations.

II. *General discussion of simulation techniques*

Since the simulator must be physically large to receive large test pieces, and must withstand evacuation without collapse under atmospheric pressure, the exterior chamber or housing is most conveniently made in the form of a right circular cylinder, with hemispherical ends. Internal surfaces exposed to radiation will be rendered light-absorbing so far as is compatible with their functions.

Gross pressure reduction will be achieved by basically conventional pumps. However, there is a limit to the speed of evacuation to even a perfect vacuum from a closed chamber through a finite orifice. This renders it impossible to achieve, by mechanical pumping (including under this term the operation of diffusion pumps) the required removal of molecules not normally found in space without return to the test piece. Fortunately, refrigeration of the test piece station by refrigerated walls can be applied not only to reduce temperature, but to condense out such molecules. As will be discussed in more detail, the lowest temperature required for adequate simulation may be determined rather by the requirement for condensation than by the necessity of simulating strictly thermal conditions.

The simulated solar radiation is composed of a variety of bands whose spectral characteristics may require adjustment by optical filtration of excessive energy concentrations in certain spectral regions. The primary sources of radiation in such bands, even before correction by filters, are much less than perfectly efficient. Therefore it is uneconomical to locate the primary sources of the solar radiation within the chamber. These, together with their correcting means (and any optical means needed to fuse into single beams the radiation from several different sources) are located outside the chamber and their radiation is directed into it through highly transparent windows. Since the solar source comprises a larger energy input than the earth radiation, and since it must be located with respect to windows in the chamber walls, the most feasible way to alter the relative orientation of the test piece and the solar radiation is to mount the test piece on gimbals controllable from outside the chamber.

The radiation from the earth has, to a sufficient approximation, the special distribution of a body at a temperature which known materials can withstand for indefinitely long periods, and which known materials can focus or reflect. Therefore it is feasible to provide within the simulator chamber an efficient source whose uncorrected radiation is satisfactory and may be concentrated mostly upon the test object, without needless dissipation of stray radiation to the walls, where it would constitute an additional load upon the refrigerating system. As there is no objection to locating the entire source of simulated earth radiation within the chamber, such a source may be mounted adjustably with respect to the test piece and the source of simulated solar radiation, although only one degree of freedom is required, since any relative orientation of the sun and the earth with respect to the test piece may be simulated by moving the earth radiation simulator in the one degree of freedom, and moving the test piece in the two degrees provided by the gimbal mounting.

Ideally, electrical connections to the test piece (which are required for conveying to the observer indications from various measurement transducers) should impose no restraints upon rotation of the gimbals but this would, for full gimbal mounting, invlove two sets of sliprings connected in series. The possible variations in resistance produced by such a system would impair confidence in the reliability of readings made through such a circuit. The number of degrees of freedom provided by the system described is sufficient to permit the simulation of continued rotation relative to the solar source and the earth source by a limited number of rotations first in one direction and then in the other, so that continuous wire connections may be employed between the observer and the test object, with sufficient surplus of lead length to permit such limited rotations.

III. *Specification synopsis*

For the better understanding of the detailed exemplification and explanation of our invention we provide figures of drawing as follows:

FIG. 2 represents a detail of construction of the vacuum system of the simulator;

FIG. 3 represents the schematic manner of connection of the vacuum pumps of the simulator;

FIG. 4 represents schematically a refrigerating panel adapted to be used in connection with our invention;

FIGS. 5 and 6 represent improved refrigerating panels invented by others but adapted to be used in connection with our invention;

FIG. 7 represents the desired spectral distribution for solar simulation and the spectral distribution produced by particular radiation sources;

IV. *Mechanical structure*

Figure 1:
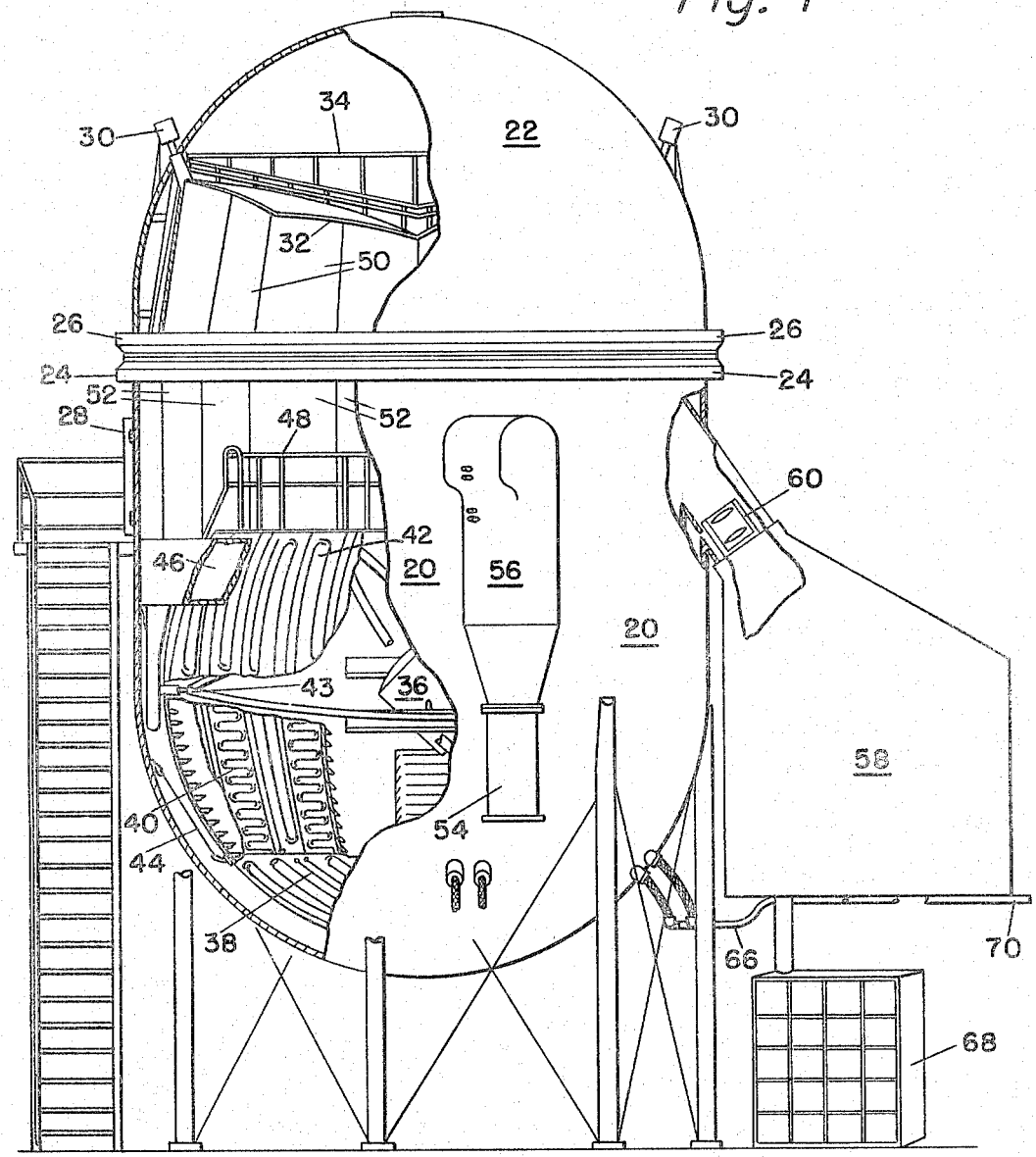
FIG. 1 represents a general, partly sectional, view of a space environment simulator in accordance with our invention.

Fig. 1 represents partly in section or cut-away an embodiment of our invention which is a preferred form in that it is one actually chosen for construction and use. The nature of our invention is such that the particular mechanical designs and other features which are chosen for a given model will necessarily vary as a function of the desired maximum size of test piece to be accommodated, and the range of tests which it is desired to perform. The size of the embodiment represented is such that the diameter of the outer housing 20 is about 32 feet, and, with the upper cap or dome 22 in place, the vertical length of the vessel is about 54 feet. The housing 20 is generally a circular cylinder terminated at the bottom in a hemisphere to render it better able to withstand external atmospheric pressure when it is evacuated. The better to endure low temperatures and also to insure against corrosion either from external ambient agents or from any corrosive materials released inside during testing or maintenance or repair operations, the shell is made of stainless steel, which may be type 304 ELC and, in an actual structure of the dimensions given, was $19/32$ inch thick at the ends and $7/8$ inch thick in the cylindrical portion. As is evident from the figure this structure is supported by vertical columns. It must be understood that the art of constructing sealable vessels of this kind is part of an art well known and widely practiced as, for example, in the construction of chemical plants, and not a part of our invention. (There is, in fact, a published Code for Vacuum Vessels promulgated by the American Society of Mechanical Engineers.) The upper hemispherical cap 22 is also constructed of stainless steel. Housing 20 and cap 22 are, as represented, provided with mating terminal flanges 24 and 26, respectively, which contain circular grooves (not shown) adapted to receive two compressible O-rings, which in the present design are of half-inch Buna N rubber composition or other suitable material to insure a hermetically tight closure without the necessity of machining such large mating faces to a perfect mating fit, and also to avoid breaking of the seal as a result of any slight temperature differences which might readily exist by accident in a structure of such large size. An access door 28 for human beings and a small apparatus is provided as represented, with a stairway for convenient external access to the door 28. For better ease of sealing, door 28 is preferably oval and provided with gaskets and secure dogging means; in the embodiment actually constructed a width of 40 inches and a height of 84 inches have been chosen.

However, since the purpose of constructing so large a vessel is to permit the introduction of large test pieces for which door 28 is completely inadequate, major access is afforded by the removal of cap or dome 22. This may be accomplished by providing sling fastening means, such as eyes, on flange 26, and elevating cap or dome 22 by a large crane; but, since crane means are the simplest way of lowering large test pieces into the simulator, in the present actual design it was found preferable to provide a floor (not shown) approximately level with the closure line between flanges 26 and 28, and to provide simple jacks to raise dome 22 enough to clear flange 24 and its associated O-rings, so that the dome 22 may be moved on a wheeled or roller-supported cradle to rest on the floor, to one side of the fixed housing 20. This has the advantage of leaving the entire chamber accessible from above, and also is considered less likely to cause accidental distortion of dome 22 and its flange 26. This is, however, a design choice.

There are represented mounted on dome 22 television cameras 30, which may be used to view the interior of the simulator while it is in operation. There are also represented mirrors 32, which will be described in more detail under heading VI, Solar Radiation Simulator, and a supporting structure 34 for sustaining mirrors 32 inside the dome. As will be described in more detail under heading VI, structure 34 may desirably also carry refrigerating means for cooling mirrors 32 to reduce their temperature somewhat below that which they would otherwise assume. Economical design of dome 22 may also incorporate internal bracing to render it more rigid against the external atmospheric pressure, but this is part of the well-known art.

The volume in which the test specimen 36 is to be located is, as represented, toward the lower portion of housing 20, and is largely surrounded by refrigerating panels 38, 40 and 42 which constitute, respectively, the bottom (or "polar cap"), lower lateral, and upper lateral portions of a partial sphere. Since the entire chamber formed by housing 20 and dome or cap 22 is to be evacuated during operation of the simulator, it is desirable for economy of refrigerating capacity that thermal resistance between the panels and housing 20 be maximized. This is accomplished by supporting bottom panels 38 by rod and turnbuckle assemblies 44, which are small in area and provide a long leakage path. Panels 40 are provided with conventional mechanical means to prevent them from falling outward, binding them together so that they rest on panels 38 for support. Panels 42 rest matingly on panels 40, completing the partial sphere. Gimbal structure 43 is supported by connections which return to the structure of housing 20, since the panels 38, 40 and 42 are not conveniently designed to carry heavy loads in addition to their primary functions. A hollow ring-shaped member 46 is provided as represented to serve as a cat-walk for a convenient position from which to observe and adjust the specimen, measuring devices, and other similar objects.

A hollow tube rail 48 is also provided for safety. The member 46 and the rail 48 are adapted to have refrigerating medium circulated through them in order that, if an observer in a space suit is present during the operation of the simulator, heat emanating from him will be absorbed as close to him as possible, with minimum disturbance of the heat balance by his presence. If it is desired to permit ready access of such an observer during the operation of the simulator, a refrigerated and evacuable intermediate lock may be provided at and hermetically connected with door 28; the use of such locks is, of course, anaologus with the use of locks for underwear ingress to and exit from submarines.

While the upper side portions of the cylindrical part of the chamber housing will not, for the most part, be in line of sight from the test piece station, they will be viewed by reflection from the test piece station along any line of sight which does not come within the angle of collimation of the solar radiation. They must therefore be shield by "cold, black" surfaces so that the solar source will correctly simulate the actual sun. The surfaces provided for this purpose have been designated as upper and lower solar panels, numbered, respectively 50 and 52. (The term "solar" in this instance refers, not to the energy radiated from the solar source, but rather to the cold blackness which appears when the solar reflector 32 is viewed at an oblique angle.) These panels are hung on rods or turnbuckles, not shown, similarly to the method employed for panels 38.

Certain general considerations pertinent to the mechanical design of the simulator must be pointed out. Because of the tendency of many common metals to deteriorate in mechanical properties at very low temperatures, stainless steel is preferred for construction. The necessity of securing vacuum-tight joints recommends welding as a fastening technique for permanent connections, although brazing is permissible where occasional breaking of a joint is desirable. Temporary connections should be provided with firm mechanical fastening and gaskets—preferably double O-rings in concentric grooves in mating faces as employed between flanges 26 and 24. Soft solder containing tin (or other tin alloys) is subject to deterioratioin by tin pest.

Since the inside of the chamber 20 (and the dome 22) will be in good thermal connection with outside environment, it is desirable to reduce the emissivity of these surfaces. This may be accomplished by refinishing them to Class 4 finish after completion of the various assembly operations which tend to impair the original finish.

It is known that bearings are subject to rapid galling and wear at low pressures and temperatures, and one of the objects of the simulator is to test bearings under such conditions. This may raise the question as to how it is possible to equip the gimbal system with bearings. The speed, loads, and total revolutions during one complete test are much lower in the gimbal system than in equipment actually intended to operate in space, and therefore the very same bearings which are being tested in the simulator could be used in the gimbals. However, stainless steel operating in rolling contact with hard organic plastic (such as Teflon balls operating in stainless steel races) is adequate for the gimbal service.

Since the use of electric motors for mechanical drive is highly developed, and their particular application is subject to variation in accordance with design considerations, details of the drive have not been specified.

A diffusion pump 54 is represented connected through a port in the housing 20 and via a liquid nitrogen-cooled trap 56 to exhaust gas from the simulator. The exhaust conduit of the pump is not represented as connected to the forepump which is required for its operation since this is part of the well known art of operating diffusion pumps, and representation of the forepump would undesirably complicate the figure, and conceal some of the less completely conventional details. For similar reasons, only one diffusion pump is represented, although in the design being described, two such pumps are located around the housing 20. A battery of roughing pumps is also provided for initial evacuation of the simulator down to a pressure at which diffusion pumping becomes effective. A schematic diagram of the way in which these pumps are all connected is provided in FIG. 2; mechanical representations of these pumps are not provided because their construction and use is old and well known.

A housing 58 is represented adjacent to the main chamber. This houses a radiation source for simulating solar radiation, which is described in detail under heading VI Solar Radiation Simulator. Quartz lenses forming part of the projection optics 60 are presented here because they perform a mechanical function in that a hermetic seal is maintained between the edges of the quartz lens closest to the main simulator chamber and the tubulation in which it is mounted. This permits the source housing 58 and its contents to be left at atmospheric pressure during operation, and allows the use of an air jet (not represented) to cool the lenses and other optical parts. As is the case with the representation of the diffusion pump, the representation of a single solar source housing 58 is only a partial representation of the facts. Mirror 32 is represented as composed of several parabolic reflectors conjoined to cover a large area, each reflector being shaped so its focus lies adjacent the wall of housing 20. Thus, for example, projection optics 60 lie at the focus of a parabolic reflector 32 at the right of the dome 22. The focus of the more completely represented parabolic reflector at the left lies at the left of the simulator, and a second solar source, in a similar housing 64 must be provided there; but to represent it in the figure would require a reduction of the scale of the drawing, without any compensating improvement in comprehensibility. The required relation among the radiation source, the optics, and the reflector is explained in detail under heading VI.

Cryogenic lines 66 and power supply racks 68 are represented primarily to symbolize the fact that they are required. Actually, a large number of hermetically sealed penetrations into the simulator interior are required for control, measurement, and power connections, and for circulating refrigerant. Industrial equipment design principles, particularly as exemplified in the chemical industry, are known for accomplishing this.

While the simulator is to be housed in a building, no details of this have been shown, except for a representation of a floor 70, upon which the solar sources and their housings 58 rest.

V. *Temperature and pressure control means*

The first gross approach to reducing pressure inside the simulator chamber is the vacuum pump. The diffusion pump is about forty years old, and, together with suitable positive displacement forepumps, is available in a wide range of sizes. Modern diffusion pumps employ silicone oils, eliminating many of the problems created by the mercury originally employed in them.

However, even modern silicone oils may "creep" somewhat into a vacuum system, and partly for this reason, and partly to insure the low temperature of any surface so located as to be capable of radiation into the working space, the baffles 72 (FIG. 2) of the elbows 56 which connect the pumps 54 to the chamber wall 20 proper are refrigerated by passage of liquid nitrogen through the passages 74. This refrigeration serves to reduce the radiation from the elbow 56 into the simulator test piece station, and at the same time causes condensation of any volatile materials which may move backward from the vacuum pump into the elbow 56.

FIG. 3 represents schematically the actual layout of pumps for a particular embodiment of our invention. The following description of the nature and mode of operation of the pump system is given for completeness, since it does not depart beyond the bounds of the known art. For this reason, pump speeds will be given, and they will be identified for the reader's convenience by the vendors' type numbers. The vendors are: Kinney Mfg. Division, New York Air Brake Company, 3631 Washington Street, Boston, Massachusetts; Consolidated Vacuum Corporation, New York City, N.Y.; W. M. Welch Scientific Company, 1515 Sedgwick Street, Chicago, Illinois. The piping connections are represented in FIG. 3 by single lines, and the interconnecting valves are conventionally represented. Detailed statements of which of the represented valves must be opened or shut to achieve the particular sequence of operations here recited will be omitted, as obvious even to the unskilled in the art.

Each pump 54 is a Consolidated CVC MC–28,000, having a nominal speed of 27,000 liters/second, and an input port 32 inches in diameter. Each pump 54 has its own forepump 78, Kinney KC–15, speed 15 cubic feet/minute. However, these constitute the final pumping units. Initially, after closing of the simulator chamber at atmosphere, five Kinney KD–485 pumps 80, speed of each one being 200 liters/second, pump from a common header until the pressure in the chamber falls to about a tenth of a millimeter of mercury. Simultaneously with this pumping operation, a Consolidated KS–2,000 diffusion pump 82 is warmed up with a Welch 1402 forepump 84 serving it. The valve connecting pump 82 to the header remains closed during the warming up period. Nominal speed of pump 82 is 1,200 liters/second. After the chamber pressure has fallen to approximately a tenth of a millimeter of mercury, by suitable valve manipulation pumps 80 are caused to serve as forepumps for diffusion pump 82, pump 84 being shut down (its sole function being to hold down the exhaust pressure of pump 82 when 82 is pumping only against a closed inlet), and pump 82 is then connected to exhaust (through pumps 54) until the chamber pressure falls to approximately half a micron of mercury. At this point pumps 54 are warmed up and, when they are pumping, served by their individual forepumps 78, the remaining pumps may be shut down. It may be remarked in passing that, although the pumps 54 have intake orifices 32 inches in diameter, the diameters of the openings in the elbows 33 are 50 inches and, despite this, calculations indicate that the two pumps 54 with elbows have a speed no greater than that of one pump 54 without elbows.

Pumping of this sort is very effective in reducing pressure down toward values which correspond to a mean free path which is comparable with the dimensions of the pumping orifice. At pressure higher than this, when the pumping action removes molecules from the orifice through the pump, immediately adjacent molecules will tend to be pushed toward the orifice by the impacts of molecules behind them. But when the pumping has progressed to such a point that there are relatively few molecules colliding with the molecules nearest the pumping orifice, there is less direction of the molecules into the pump. The molecules wander around, hitting the walls and their few fellows, and wander into the pump jets only on a random basis. The result is a reduction in the actual speed with which gas is removed from the chamber. In a device as expensive and burdened with fixed charges as a space environment simulator is likely to be, waste of time is undesirable. But this loss of pumping speed has an even graver consequence: gas molecules emitted by the test object during operation will not be removed fast enough to meet the criterion that most of them shall not return to the test object and this defect is a failure to meet the required conditions for simulation.

Fortunately, meeting the requirement for simulating the extreme cold of space leads toward a solution of the pumping problem. Since the heat balance of a satellite of the earth will be achieved under solar radiations of the order of 130 watts per square foot, and earth radiations or reflections of the order of from a tenth to a half of the solar radiation, calculation shows that the temperature rise of a test specimen will be sufficiently great so that it will be altered only slightly by surroundings having a temperature rather considerably above the apparent temperature of true space. The temperature of liquid nitrogen is about 77 degrees Kelvin; and chamber walls cooled to approximately this temperature afford adequate thermal simulation of actual space. This temperature is, however, insufficiently low to freeze out many of the gases of the atmosphere. Liquid hydrogen produces a temperature of 20 degrees K., at which temperature only hydrogen, helium, and neon remain uncondensed. FIG. 4 therefore represents a very simple wall structure 86 adapted for use in our invention, showing hydrogen conduits 88 on the wall structure, to which there may be connected ducts for supplying and removing the hydrogen refrigerant, which may be provided by a conventional hydrogen refrigerating system not represented.

As is true of all refrigerated panels of this general category, the side facing toward the interior of the evacuated and refrigerated space should be black, not only for visible light, but for the range from about 1,800 Angstroms to about 30,000 or more. Anodizing or other mode of oxidizing the surface of aluminum, particularly with colorants to produce blackness, is suitable. However, since it is desired to minimize heat transfer between the external world (represented by shell 20 and cap or dome 22), it is also desirable that the surface of the refrigerated panel which faces outward, that is toward the shell or dome, be as reflective as possible.

A hydrogen-cooled system as described is operative, but tends to be somewhat expensive to operate because it departs so very far from isothermal operation by freezing out gases whose condensation temperatures are far above the temperature of 20 degrees K. As a matter of economy, therefore, it is preferable to employ one (or both) of the structures disclosed in the copending application of D. J. Santeler entitled "Cryogenic Pumping Apparatus," Serial Number 59,642, filed September 30, 1960 now Patent No. 3,131,396, and in the copending application of Wood and Nesbitt, entitled "Improved Cryogenic Pumping Apparatus," Serial Number 66,820, filed November 2, 1960 now Patent No. 3,130,562 both of which applications are assigned to the assignee of the present application. Both of these applications, by different structures, effect cryogenic pumping at two different temperatures. This amounts to an approximation to isothermal operation, and is therefore more efficient than the simple hydrogen-cooled structure represented in FIG. 4. The structures of both the referenced applications have this in common, that they expose to radiation and to gases emitted from the test piece surfaces cooled by liquid nitrogen to approximately 100 degrees K.; and they provide other surfaces cooled to lower temperature (about 20 degrees K.) so oriented that they are shielded by the 100 degree surfaces from direct bombardment from the test piece, but gases which are not condensed at 100 degrees K. rebound to the colder members, where most of them are condensed.

While the referenced applications describe in detail the teachings of their respective inventors, and the structures and general teachings therein are not our inventions, for the purpose of completing our disclosure of the preferred manner of practicing our invention, FIGS. 5 and 6 are provided.

FIG. 5 represents a structure disclosed by Santeler. The structure base 150 is a flat plate upon whose reverse side conduits 126 have been secured in good thermal contact (welding is adequate and simple). Baffles 152 protrude from the obverse side of plate 150, being secured thereto in good thermal contact. Shielded or shaded by baffles 152 are fins or condensers 153, which are in good thermal contact with conduits 154. In operation the conduits 126 are traversed by a refrigerant at approximately 100 degrees K. or somewhat less; nitrogen is what is actually employed in the specific embodiment under consideration. Plate 150 and baffles 152, in consequence, are also at approximately 100 degrees K., or somewhat less, and condense certain gases, but not all of the common gases of the atmosphere. Conduits 154 are traversed by gaseous helium, and they and fins or condensers 154 are cooled to a temperature of the order of 20 degrees K., which is low enough to freeze out the residual common gases of the atmosphere. Thermal radiation arriving along the paths indicated by broken lines 162 and 163 will impinge only upon nitrogen cooled surfaces of 150 or 152. Gas molecules arriving along similar paths will, if not condensed bounce off behind baffles 152 and will have a very high probability of hitting the back side of a fin 153; but those that do not will bounce off the reverse of baffle 152 and have a high probability of striking the front side of a fin 153. In either case, they will (except for helium molecules) have a very high probability of being condensed on the surface of fin 153. It is thus evident that this structure has the economic advantage that thermal radiation and directly impinging gas molecules will strike baffles 152; the thermal radiation will be largely absorbed, relatively high-boiling molecules will be condensed, and low-boiling molecules will, on the average, suffer some absorption of energy before being reflected to fins 153. Thus as much as possible of energy will be absorbed at the temperature of the nitrogen, and the load on the helium system will be minimized. Details of this invention are given more completely in the application of Santeler to which reference has been made; reference numbers of the present FIG. 5 differ only by the initial digit "1" from those of Santeler.

FIG. 6 represents one embodiment of a structure according to the invention of Wood and Nesbitt, to which reference has been made. (Reference numbers differ only by the initial digit "2" from their reference numbers.) Base plate 260 is deformed into V-grooves at 261, refrigerant channels 226 being secured in good thermal contact with 260 as represented. However, the baffle 152 of Santeler is here replaced by the honeycomb wall baffle 262, which has numerous passages 264. Absorbing fin 265, provided with refrigerant conduit 267 in good thermal contact therewith, serves approximately the same function as fin 153, provided with refrigerant conduit 154, as represented in FIG. 5. A honeycomb baffle 268 may also be attached in good thermal contact with base plate 260 as represented. The basic general principle which it is desired to emphasize herein in connection with the invention of Wood and Nesbitt is that the use of honeycomb structures greatly increases the probability of collision between the walls and any gas molecules either initially incident or rebounding from the structure. Also, so far as thermal radiation is concerned, the honeycomb is recognizably an approximation to the black-body furnace or "Hohlraum" whose aperture appears to have emissivity and absorptivity of unity. The structure of Wood and Nesbitt is therefore particularly valuable in instances where it is desired to secure high absorption over a very wide spectral range (such as the roughly four octaves involved in the subject of the present application).

VI. *Solar radiation simulator*

There are two primary parameters which constitute problems in the provision of simulated solar radiation. First, the spectrum must be approximated so that it will simulate, on the test piece, the effects of the actual celestial source. Table I shows, in parallel columns spectral bands into which the entire spectrum may be divided for purposes of approximation, the tolerance within which it is considered feasible to adjust the energy content over the specified band, the ideally desirable tolerance, the percent of the total energy contained within the specified band, and the phenomena believed to be most significantly affected by radiation in the given band.

TABLE I

| Band °A | Feasible Tolerance Energy Match, Percent | Ideal Energy Match, Percent | Percent of Total Energy |
|---|---|---|---|
| 1,800–2,500 | ±20 | ±10 | 1 |
| 2,500–3,300 | ±20 | ±2.5 | 4–5 |
| 3,300–4,000 | ±20 | ±2.5 | 6 |
| 4,000–5,000 | ±10 | ±5 | 13 |
| 5,000–7,000 | ±10 | ±5 | 24 |
| 7,000–8,000 | ±10 | ±5 | 9 |
| 8,000–9,000 | ±10 | ±5 | 8 |
| 9,000–11,000 | ±10 | ±5 | 11 |
| 11,000–15,000 | ±10 | ±10 | 11 |
| 15,000–20,000 | ±20 | ±10 | 6 |
| 20,000–30,000 | ±20 | ±20 | 4 |
| Total | | 98 | |

The range of wavelengths, from 1,800 to 30,000 Angstroms, covers more than is ordinarily regarded as the conventional optical spectrum, and poses a problem as to the source to be employed. Xenon or high-pressure Mercury-Xenon lamps, which are commercially available from the Osram Corporation of Germany, and from the Hanovia Chemical Company, Newark, N.J., in quartz envelopes, with input ratings of several kilowatts, have adequate energy outputs over this range, although the exact energy distribution must be achieved by the use of filters to cut down the excess in certain bands. The relative energy distribution from the 5-kw. Osram Xenon-Merucury lamp is represented in FIG. 7 as curve 90, together with the required final energy distribution curve 92. The abscissa is in microns of wavelength and the ordinates are relative energy. It will be observed that the lamp output is relatively low in the visible and near infra-red range; and for economy it is possible to reduce the required amount of filtering by bolstering the distribution with visible radiation and near infrared from conventional light sources of less exotic nature, such as mercury vapor lamps.

A second parameter which exists primarily because simulation, rather than scale modelling, is required, is the so-called cold black background. A real sun at a real astronomical unit of distance from a real earth will appear to an observer at or near the earth to subtend roughly $\frac{1}{100}$ radian; and the radiation from such a source will appear fairly well collimated, i.e., an observer looking at the real sun would find that moving his line of sight only slightly off the axis between himself and the sun would cause him to view cold, black, interstellar space, looking past the sun. Calculation indicates that, within the useful limits of accuracy of the system, collimation within plus or minus 1½ degrees is adequate; most of the phenomena of interest are expressible in terms of trigonometric functions which vary only slightly over this angular range from a central axis. The imperfections of even the best optical devices preclude perfect collimation of a beam of radiation; thus a nominally collimated beam is, in strict fact, only approximately collimated, and it is economical to relax, where requirements permit, the limits of approximation.

Figure 8:
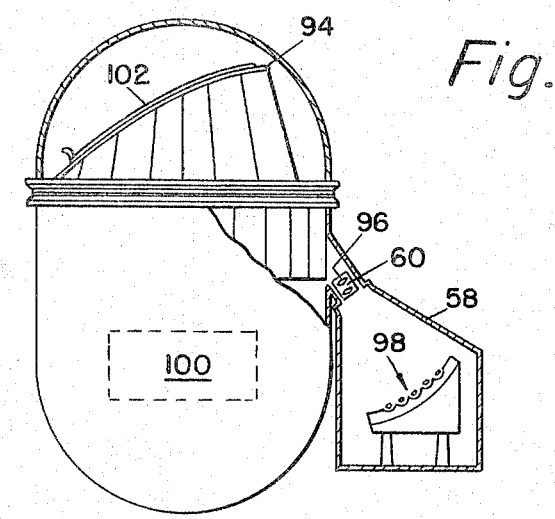
FIG. 8 represents a single-reflector optical system applied to a simulator embodiment generally similar to that of FIG. 1.

It is, however, apparent that in order to illuminate uniformly a test piece which subtends much more than the angle corresponding to the collimation limits with respect to the light source, the light source must extend over substantially the entire test piece. This necessarily means that if, for example, the test piece is twenty feet in diameter and the light source is located forty feet away from it, the light source will subtend roughly thirty degrees with respect to the test piece. And yet, an observer (including a mechanical device) located at the center of the test piece and looking as much as two degrees off-axis must see cold black space. This requirement can be met by resort to fundamental elementary optics. Any anastigmatically focusing lens or mirror will produce a substantially collimated beam if a source of radiation is placed at its focus and allowed to illuminate the lens or mirror. An observer looking parallel to the collimated beam will see the source; but if he looks off-axis, he will see the space adjacent to the source. One convenient way of applying this principle to produce the desired cold, black sun simulation, is to provide a cap consisting of one or more portions of parabolic reflectors whose axis is normal to the test piece location, and whose focus is located approximately in the cold wall of the chamber. An embodiment of this solution is represented in FIG. 8, where a reflector 94 having a cross section of the shape of a parabolic segment and such a focal area 96 is represented. The focal point 96 is arranged to coincide with the location of a real image of the radiation source 98 formed by standard optical means which may conveniently be of quartz (because of its high transparency to ultraviolet radiation, inter alia). This real image will illuminate the appropriate portions of the parabolic reflector, and the radiation will be reflected in collimated beams down to the test piece location 100. However any off-axis optical paths will lead, by reflection, to the cold wall; so that, to an observer at the test piece, the source 98 will appear, despite the actual large dimensions of the reflectors, to be a very distant, almost point source.

The high reflectivity which is required, by definition, as a characteristic of a good reflector, causes the temperature of the reflector to be fairly non-critical because of the resultant low emissivity; but it has been found, in fact, that it is desirable at least in a particular embodiment of our invention, to cool the reflector somewhat below ordinary ambient air temperatures by refrigerating coils 102 represented in the figure. The required temperature reduction is essentially that required to reduce the thermal emission by the low-emissivity reflector surface to no more than the thermal emission by the high-emissivity darkened cooling wall surfaces. The amount of heat to be removed to keep the temperature at this figure will be determined largely by the radiation absorbed by the reflector.

When an isotropic radiant source is placed at the focus of a parabolic reflector, the resultant collimated light beam is not uniformly illuminated. The represented reflector system must, in order to produce uniform collimated radiation, be non-uniformly illuminated. This technique is well known in the conventional optical art, and is mentioned merely for completeness.

FIG. 8 has been made similar to FIG. 1, reflector 94 being substituted for mirrow 22 of FIG. 1. As a matter of convenience, for the described embodiment, a four-part reflector 22 with four radiation source housings 58 and sources therein appropriately located, are used; but if the difficulty of providing a single large paraboloidal mirror 94 is not objectionable, a single source 58 is permissible.

Figure 9:
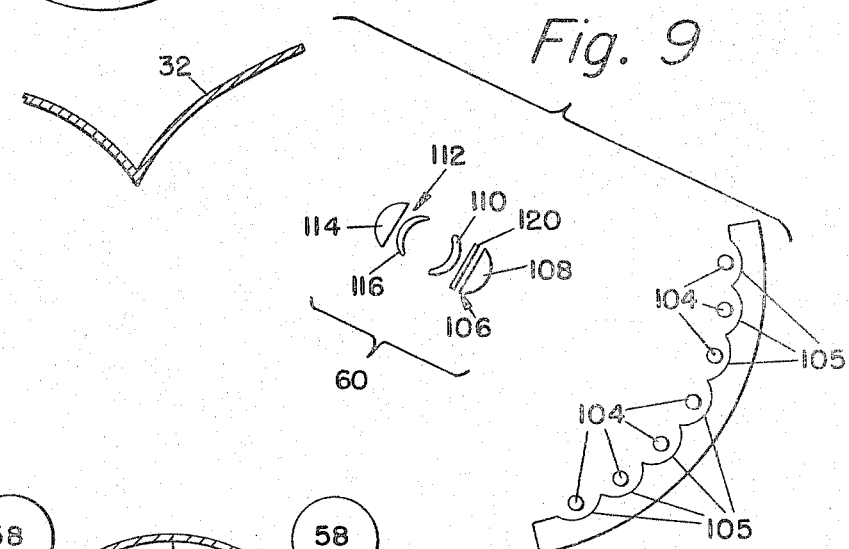
FIG. 9 represents the elements only of the optical system represented in FIG. 1 or FIG. 8.

Referring for more detail to FIG. 9, which represents schematically an optical system suitable for the embodiment of FIG. 1 or FIG. 8, the light sources 104 are located at a constant distance 178.3 inches from the first lens 106, which is 18.9 inches in diameter, and has a focal length of 19.2 inches. Because the extremely wide range of wavelengths (about four octaves) to be transmitted passes through relatively few readily available optical substances, the lenses are constructed of quartz. This makes it impossible to employ the conventional optical technique of combining positive and negative lenses of different materials to achieve color correction. However, it is possible to achieve adequate correction by combining a positive plano-convex lens 108 with a negative meniscus lens 110, the combination having the focal length specified. The second lens 112, 17.3 inches in diameter, has a focal length of 19.3 inches, and is similarly a positive plano-convex lens 114 combined with a negative meniscus lens 116. In actual assembly, the negative meniscus lenses lie between the two positive lenses, with their convex sides toward each other, and their concave sides facing the plano faces of the positive lenses. The second lens 112 lies at the focus of its paraboloidal reflector 32 or 94, as the case may be.

Each light source 104 is located in a cylindrical reflector 105, 15 inches across its aperture chord. When the light sources are operated, their radiation illuminates lens 106; this lens is provided with a mask 120 which restricts the illumination to reflector 22, and prevents undesired stray illumination of other parts of the dome 20. The second lens actually forms a real image of the mask upon and coincident with the reflector. The first lens 106 and the second lens 112 are spaced apart by approximately the focal length of either (since their focal lengths are very nearly the same).

Since each of the light sources illuminates the whole surface of the first lens 106, it is possible to adjust the spectral distribution of the illumination by mixing light sources of different kinds. However, there is a strong probability that some spectral adjustment will be required. The system has been so designed that light will pass substantially normal to the plane surface of the positive element of the second lens. Interference filters, well known in the art, may conveniently be deposited upon this plane surface to achieve spectral adjustment. ("The Handbook of Physics," edited by Condon and Odishaw, published in 1958 by the McGraw-Hill Book Company, of 330 W. 42nd St., New York City, N.Y., pages 6–103 through 6–106 describes interference filters, and on pages 6–107 through 6–108 contains a bibliography of some fifty references on the subject.)

Since the light sources and optical system described illuminate the paraboloidal reflector 32 from its focus, it will be apparent to those acquainted with elementary optics that this illumination will be reflected parallel to the axis of the paraboloid (which is vertical, in the figure, passing through the focus of the reflector) and thus will pass down into the central portion of the simulator, to the test piece station. It is desired that this illumination be uniform over the test piece, but it is well known that uniform density of illumination incident upon a paraboloidal reflector will not produce uniform density of reflected illumination from the reflector. When required the illumination density may be adjusted by applying fine dots of opaque material (aluminum is used) to the surface of the second lens as required.

The wide range of wavelengths to be covered imposes stringent requirements upon the reflecting as well as the refracting materials. Fortunately aluminum has been well known for many years for its high reflectance over the spectral range of interest, and the surface of the reflector may be of aluminum deposited upon a film of silica deposited upon a nickel metal base which may conveniently be electroformed. Aluminum deposited upon massive quartz is, perhaps, more conventional in optical systems of moderate size, but weight and cost make it impractical here.

The illumination of the reflector 32 through lens 112 is clearly not actually illumination by a point source; however, the limits of divergence of the beam actually directed toward the test piece station are adequately simulative of solar radiation.

The description of the solar simulation source has been exclusively in terms of a single reflector and ancillaries. There is no theoretical limitation upon the size of specimen which may thus be illuminated with simulated solar radiation. However, it was suggested by a consultant that multiple sources and reflectors would produce a more convenient and economical design (and a possibility of other advantages) for the presently considered embodiment. Therefore, four separate reflectors, meeting without gap at their mutual boundaries, and four optical and source systems are employed in the preferred embodiment. It is here noted that the consultant reserved his rights in the multiple-reflector design, with license to the assignee of the present application, and is understood to have filed an application for a United States patent on certain features of this design. (Mann, Serial Number 50,489, August 18, 1960, Radiant Energy Collimating Apparatus now abandoned.) This information is included in order that it may be recognized that the disclosure herein of the use of multiple reflectors is not a representation that such design is our invention, nor a dedication thereof to the public.

Figure 10:
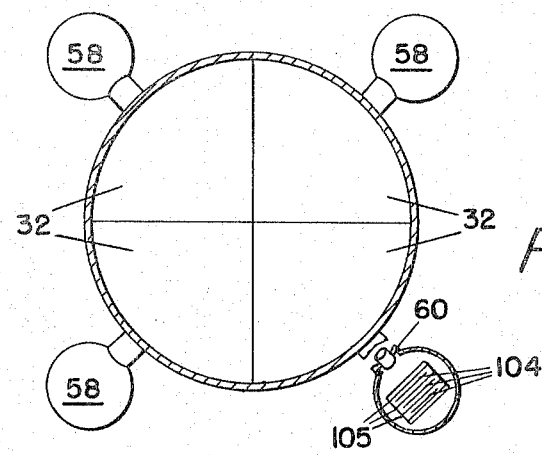
FIG. 10 represents a plan view of the optical sources in their relation to the main body of the embodiment represented in FIG. 1.

FIG. 10 represents a schematic plan view, partly in section, of the four reflectors and the associated optical and lamp systems.

VII. *Earth albedo and radiation simulator*

The earth radiation incident upon a space vehicle will vary widely; calculations indicate that a satellite at an altitude of 100 miles at a latitude 60 degrees will receive a maximum of 65 watts per square foot. Since the altitude chosen for the computation is so small that such a satellite would have an extremely short life, this may reasonably be regarded as a lower bound of altitude, and an upper bound of earth radiation. The thermal radiation from the earth itself is adequately simulated by radiation from a black body at 252 degrees K. As required, such radiation may easily be supplied from an electrically or otherwise heated source inside the chamber. The efficiency of conversion of input energy to the desired wavelength range will be essentially unity, so that there is no objection to including the converter inside the refrigerated space. If the reflection from the earth is to be simulated as well as the earth's own radiation, the surface of the albedo simulator must be made of suitable reflectivity and the albedo simulator must be located so it can receive directly some of the radiation from the solar source and reflect it upon the test piece. It is evident from the preceding discussion that earth albedo simulation is somewhat ad hoc with respect to a particular test piece and particular orbit to be simulated. No particularly advantageous or especially generally useful method of albedo simulation has been here disclosed, except for the fact that simple black-body radiation is a usefully accurate approximation to terrestrial radiation and that movement of the albedo source relatively to the solar source is the simplest way of achieving such simulation. The discussion of albedo simulation has been included for completeness.

VIII. *Summary*

To recapitulate teachings of our invention and its embodiment:

A chamber capable of being closed hermetically tight is provided as a barrier against the entry of external atmosphere. It may be opened for insertion or removal of test pieces and apparatus, or for human access thereto. Refrigerating panels are mounted inside this chamber, in poor thermal contact therewith; and the interior surfaces of the chamber and the surfaces of the refrigerating panels which face them are further made reflecting to impair heat transfer. All surfaces which face directly upon the working volume inside the chamber (including the test piece station) are rendered as nearly perfectly absorbing as possible, either directly by (e.g., for aluminum) anodizing, or by being caused to reflect radiation from such black surfaces, as is done with the reflector for the solar source. Mechanical pumping means are provided for removal of the gross content of air within the chamber; and refrigerant pumping means are provided for removal of condensible gases and vapors, particularly for insuring that any molecules leaving a test piece will have minimal probability of returning to the test piece. Solar radiation is simulated by collimated radiation whose spectral distribution over discrete ranges of wavelengths matches that of sunlight; and although a part of the optical system which transmits the solar radiation simulation subtends an angle of an appreciable fraction of a radian with respect to the test piece station, a viewer looking up at any angle differing appreciably from the angle within which the radiation is collimated will look upon cold black simulated space. The test piece may be supported by gimbals to permit simulation of relative motion between the test piece and the sun.

Elimination of gravity and simulation of van Allen radiation have not been provided. Simulation of earth albedo has been described in general principles.

A space environment simulator is a large and specialized structure; the art of constructing such structures is highly developed; ordinary skill in it is very high, appearing particularly commonly in the construction of chemical plant equipment. While the disclosure of this specification has been directed to those thus skilled, certain useful information which has become known as a result of the specific design of an embodiment of our invention has been included, for the benefit of the public, with no purpose of restricting our disclosure of such specific features.

What is claimed is particularly pointed out in the following claims:

1. A space environment simulator comprising: a hermetically sealable chamber; a test piece station in said chamber; refrigerated panels mounted in the said chamber in poor thermal contact therewith and partially surrounding the said test station and presenting to the said test station radiation absorbing faces and having refrigerable surfaces; mechanical exhaust means connected to the said chamber; a radiation source grossly simulating the spectral distribution of solar radiation; optical means located at least in part in the said chamber substantially collimating the said radiation to fall upon the said test piece station and directing non-collimated radiation from the said refrigerated panels toward the said test piece station.

2. In a space environment simulator, the improvement comprising sources of radiation directed toward a test piece station and providing over an angle simulating the angular size of a celestial source to be simulated a spectral distribution and an energy density simulating that of the said celestial source, and at all angles outside the said angle a spectral distribution simulating that of celestial space.

3. A space environment simulator comprising: a hermetically sealable chamber; a test piece station in the said chamber comprising means for supporting a test piece in the said station in controllable arbitrary attitudes; refrigerated panels mounted in the said chamber in poor thermal contact with the said chamber and surrounding the bottom and sides of the said test station and presenting to the said test station faces of absorptivity exceeding 0.95 in the range from 1,800 to 30,000 Angstroms and having surfaces refrigerable to a temperature of less than 20 degrees Kelvin; mechanical exhaust means connected to the said chamber to mechanically remove gases from the chamber; a radiation source comprising a source of radiation grossly simulating the spectral distribution of solar radiation; optical means located at least in part above the said test piece station substantially collimating the said radiation to fall with uniform density upon the said test piece station and directing non-collimated radiation from the said refrigerated panels toward the said test piece station.

4. A space environment simulator comprising: a hermetically closable chamber containing refrigerable means enclosing a test piece station and presenting to the said station faces having an average absorptivity of 0.95 over the range from 1,800 to 30,000 Angstroms; reflective means above the said test piece station, focussed upon a real image of a source of radiation of spectral distribution approximating grossly that of the sun, said reflective means directing the said radiation in a substantially collimated beam toward the said test piece station, and directing to refrigerable low-reflectivity panels any radiation emerging from the said test piece station in a direction non-parallel to the said collimated beam; means for evacuating the said chamber and means for providing refrigerant to said refrigerable means therein; means in the said test piece station for supporting a test piece and for rotating the said test piece to simulate the rotation of a satellite with respect to solar radiation.

5. A space environment simulator comprising a hermetically closable chamber having means providing access to the interior thereof when not closed, means for supporting a test piece in a test piece station therein and for rotating the said test piece to simulate the rotations of a satellite with respect to the sun; a source of radiation which, in the range from ultra-violet to infrared simulates the spectral distribution of solar radiation; optical means for directing the said radiation substantially uniformly over the area of the said test piece station, collimated over an angle which is small compared with the angle which the said test piece station subtends with respect to the top of the said chamber, which said optical means directs toward absorbing refrigerated surfaces radiation emitted from the said test piece station along paths not substantially identical with the optical path from the said source to the said test piece station.

6. A space environment simulator comprising: a chamber having hermetically sealable access means and otherwise adapted to be evacuated while subjected externally to normal terrestrial atmospheric pressure; pumping means connected to the said chamber to pump out of the chamber gases contained therein; refrigerated surfaces comprising refrigerated walls within the said chamber partially surrounding a portion of the interior volume of the said chamber to define a test piece station and connected to heat extraction means external to the said chamber adapted to reduce the temperature of the said refrigerated walls to not more than one hundred degrees Kelvin; support means adapted to support a test piece within said test piece station; a source of radiation provided with optical means for adjusting the spectral distribution of the energy from the said source to simulate the extra-atmospheric distribution of solar energy and for directing the thus adjusted energy in a substantially collimated beam to the said test piece station and for directing toward a refrigerated surface any radiation impinging upon the said optical means from the said test piece station at an angle outside the angular limits of the said substantially collimated beam.

7. The method of simulating radiation from a celestial source which comprises the steps of providing a reflector of area substantially equal to or greater than and opposed to the test area over which the said radiation is to be simulated, the said reflector being so shaped that radiation emitted from the said test area over the angular limits of collimation of the said celestial source is focussed to a finite number of discrete focal areas; directing toward the said reflector from the said focal areas radiation having a spectral distribution adapted to simulate radiation from the said celestial source; and absorbing radiation from the said test area reflected by the said reflector to areas other than the said focal areas.

References Cited by the Examiner
UNITED STATES PATENTS

| | | | |
|---|---|---|---|
| 2,277,193 | 3/1942 | Wyss | 313—111 |
| 2,755,374 | 7/1956 | Ott et al. | 240—41.35 |
| 3,010,220 | 11/1961 | Schueller | 73—432 |
| 3,064,364 | 11/1962 | Schueller | 73—432 |

DAVID SCHONBERG, *Primary Examiner.*

RICHARD C. QUEISSER, *Examiner.*